Patented June 29, 1954

2,682,470

UNITED STATES PATENT OFFICE 2,682,470

FOOD PRODUCT AND METHOD OF MANUFACTURING SAME

Charles Pavia, New Market, and Albert J. Kramer, Arlington, Va., assignors to Pavia Process, Inc., Washington, D. C., a corporation of Delaware No Drawing. Application October 17, 1950, Serial No. 190,648

6 Claims. (Cl. 99—118)

This invention relates to food products and is more particularly concerned with food products of high nutritional value, particularly in respect to protein and methods of manufacturing same.

One of the objects of this invention is the provision of a food product that is basically proteinaceous and which can not only be used for human consumption but also as a valuable feed for animals.

Another object is the provision of a product of the type mentioned which will support the growth of various molds such as those of the Penicillium type.

A further object of this invention is the provision of such a product which can be used as a substitute for milk proteins in the manufacture of cheeses or cheese like products including those obtained by mold fermentation.

A still further object is the provision of a method of manufacturing such a product from various animal fats such as hog fats, beef fats, fowl fats, and others.

A still further object is the preparation of hydrated animal proteins in which the hydration is effected by the water normally associated with the protein in its natural state.

The natural fat of the various food animals contains proteins which, we have found, if separated from the liquid fat without coagulation or deterioration, have properties which differ from the same proteins in a coagulated or degraded condition and render them useful for purposes for which the coagulated proteins would be unfit.

Accordingly, a still further object of this invention is the separation of the proteins of such fats from the fat liquor substantially without coagulation or degradation of the proteins.

In general this invention comprises comminuting the raw fat to a particle size of one- to three-sixteenths of an inch and subjecting the comminuted particles momentarily to a source of heat at a temperature above the melting point of the fat and about 250° to 325° F. higher than its own temperature.

The heat should be applied and released suddenly to a temperature below the boiling point of water and should be of a duration sufficient to expand and rupture the fat tissue without coagulating the protein therein, whereupon the fat runs out of the cells. Since the protein fat tissue is not coagulated it remains spongy in texture and becomes mechanically hydrated with any natural free water normally associated with the fat. The tissue in the hydrated form is then recovered from the fat liquor by any suitable method of mechanical separation such as straining or filtering, centrifuging, etc.

The heat may be applied to the fat particles by passing the particles in contact with the wall of a heated vessel. In order to prevent the protein from becoming coagulated by heat from the wall and in order to maintain the temperature of the mass below the boiling point of water, fresh charges of the fat particles should be continuously applied to the walls of the vessel to displace ruptured particles from the wall.

Liquid fat adhering to the hydrated tissues may be removed by pressing or by solvent extraction with ether or other fat solvents.

The recovered hydrated fat tissue is edible and of high nutritional value. It may be used as a nutrient to support the growth of various industrial molds, such as *Penicillium chrysogenum*, Thom., and other Penicilliums. It may be fermented with various industrial molds, including *Penicillium roqueforti* to manufacture fermented food products having characteristics similar to roquefort and other like cheeses.

In the coagulation of proteins, certain factors must be considered. It is known, for example, that the iso-electric point of a protein affects the rapidity with which the protein will coagulate. The quantity of heat is also a function of protein coagulation. While the temperature at which the heat is applied must be taken into consideration in any particular case, it is the total heat applied in any given period which determines the coagulation time of the protein. In other words, a protein may be coagulated at a low temperature by the introduction of a large quantity of heat and may not be coagulated at a higher temperature by only a small amount of heat.

Another factor affecting coagulation of protein, especially the time required to coagulate protein, is the size of the protein molecules themselves. A larger molecule requires a greater amount of heat while a smaller molecule requires less.

The present invention takes advantage of the fact that the isoelectric point of the fat protein and the size of the molecules thereof are such that the protein requires substantial amounts of heat to be applied before coagulation can be effected. Accordingly, even though high temperatures are employed for rupturing the fat cells, the heat is applied for only a short duration thereby preventing the protein from absorbing an amount of heat sufficient to cause it to coagulate.

The coagulation of proteins, generally, results in the release of water which is in some way chemically combined with the protein. Accordingly, by preventing the coagulation of the protein in accordance with the present invention, the water in chemical combination is retained in the protein and, in addition thereto any free water present is mechanically absorbed by the protein mass resulting in a product which is hydrated both chemically and mechanically.

We claim:

1. A food product comprising animal fatty tissue fermented with *Penicillium roqueforti*.

2. A food product resulting from the fermentation with *Penicillium roqueforti* of hydrated animal fatty tissue in its uncoagulated state.

3. The method of manufacturing a cheese-like product comprising fermenting hydrated animal fatty tissue with *Penicillium roqueforti*.

4. The method of manufacturing a cheese-like product comprising rupturing the cell walls of animal fatty tissue, extracting and removing the fat in the cells from the ruptured cells without substantially modifying the proteinaceous structure of the cell walls, and fermenting the resulting tissue with *Penicillium roqueforti*.

5. The method as defined by claim 4 in which the fatty tissue is derived from hogs.

6. The method as defined by claim 4 in which the fatty tissue is derived from beef.

References Cited in the file of this patent

UNITED STATES PATENTS

| Number | Name | Date |
|---|---|---|
| 2,132,077 | Lane et al. | Oct. 4, 1938 |
| 2,442,141 | Moyer | May 25, 1948 |
| 2,458,495 | Foster | Jan. 11, 1949 |
| 2,516,071 | Pavia | July 18, 1950 |